United States Patent
Espy et al.

(10) Patent No.: US 8,285,302 B1
(45) Date of Patent: Oct. 9, 2012

(54) SYSTEM AND METHOD FOR LOCATING DEVICES WITHIN A DATA CENTER

(75) Inventors: James W. Espy, Andover, MA (US); F. William French, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 418 days.

(21) Appl. No.: 12/570,580

(22) Filed: Sep. 30, 2009

(51) Int. Cl.
*H04W 24/00* (2009.01)

(52) U.S. Cl. ............... 455/456.1; 455/404.2; 455/456.3; 340/539.13

(58) Field of Classification Search ............... 455/456.1, 455/404.2, 456.3; 340/539.13
See application file for complete search history.

(56) References Cited

U.S. PATENT DOCUMENTS

| | | | |
|---|---|---|---|
| 2008/0247531 A1* | 10/2008 | Borislow et al. | 379/218.01 |
| 2009/0103687 A1* | 4/2009 | Peters | 379/45 |

* cited by examiner

*Primary Examiner* — Nghi H Ly
(74) *Attorney, Agent, or Firm* — Holland & Knight, LLP; Brian J. Colandreo, Esq.; Mark H. Whittenberger, Esq.

(57) ABSTRACT

A method, computer program product, and computing system for defining a device identifier for a data center device within a data center. Location coordinates are defined for the data center device within the data center. The device identifier is associated with the location coordinates to define geospatial information for the data center device within the data center. The geospatial information is processed to locate the data center device within the data center.

24 Claims, 4 Drawing Sheets

FIG. 3

Data Center: 1C_L
Locate: Hub D

Hub D is located in Rack 1B on the left hand side of Aisle 1

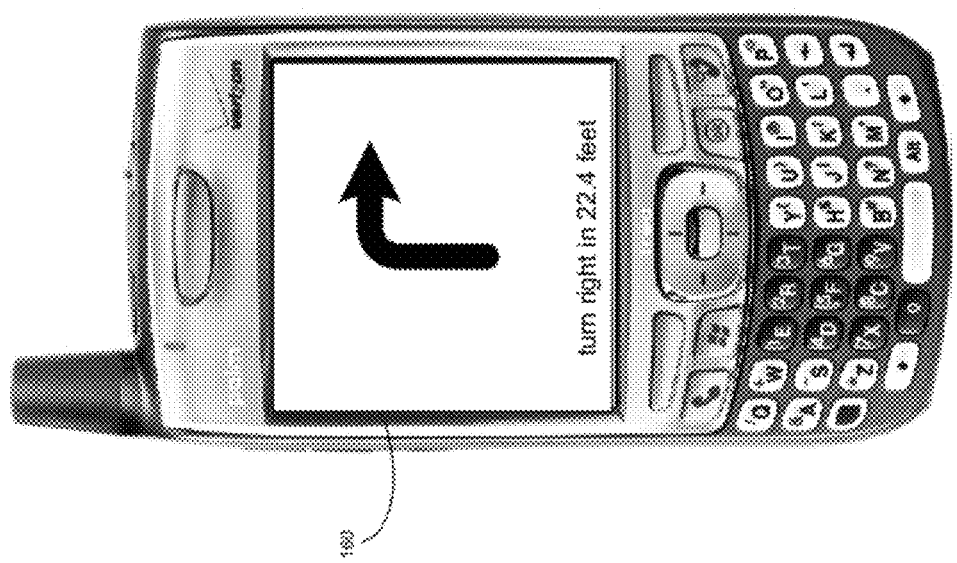

SYSTEM AND METHOD FOR LOCATING DEVICES WITHIN A DATA CENTER

TECHNICAL FIELD

This disclosure relates to locating devices and, more particularly, to the locating of devices within a data center.

BACKGROUND

Many data centers locate components (e.g. racks, servers, storage systems, bridges, routers, switches, gateways, hubs, protocol convertors, proxy devices, firewalls, network address translators, multiplexors, modems, or repeaters) along pre-defined and described aisle configurations with considerations toward service access, power distribution, interconnection, and cooling. Manual entry geographic location and/or naming schemes (e.g. maps) may be utilized to indicate device positions. The contents of a device or cabinet of devices may be further documented, again via manual entry.

The service requirement of a device within a particular cabinet may involve management functionality (e.g. either local or remote console) that may identify the required action and may ascertain the device location via consultation of the physical map. Unfortunately, as data centers consolidate functionality/improve efficiency/expand, these physical location mappings are often altered and, therefore, are subject to human error and may become outdated/inaccurate.

SUMMARY OF DISCLOSURE

In one implementation of this disclosure, a computer-implemented method includes defining a device identifier for a data center device within a data center. Location coordinates are defined for the data center device within the data center. The device identifier is associated with the location coordinates to define geospatial information for the data center device within the data center. The geospatial information is processed to locate the data center device within the data center.

One or more of the following features may be included. The data center device may be chosen from the group consisting of: a rack, a server, a component of a storage array, a bridge, a router, a switch, a gateway, a hub, a protocol convertor, a proxy device, a firewall, a network address translator, a multiplexor, a modem, and a repeater. Defining location coordinates may include triangulating a plurality of unique signals to generate the location coordinates.

The plurality of unique signals may be received from a plurality of publically-accessible GPS satellites. The plurality of unique signals may be received from a plurality of proprietary signal transmitters. The location coordinates may include a longitudinal coordinate and a latitudinal coordinate. Defining a device identifier may include one or more of: defining an IP address as the device identifier; defining a MAC address as the device identifier; and defining a unique name as the device identifier. Processing the geospatial information to locate the data center device within the data center may include one or more of: rendering a graphical representation of the data center device within a graphical representation of the data center; rendering a text-based location for the data center device within the data center; and guiding a user to the data center device within the data center.

In another implementation of this disclosure, a computer program product resides on a computer readable medium and has a plurality of instructions stored on it. When executed by a processor, the instructions cause the processor to perform operations including defining a device identifier for a data center device within a data center. Location coordinates are defined for the data center device within the data center. The device identifier is associated with the location coordinates to define geospatial information for the data center device within the data center. The geospatial information is processed to locate the data center device within the data center.

One or more of the following features may be included. The data center device may be chosen from the group consisting of: a rack, a server, a component of a storage array, a bridge, a router, a switch, a gateway, a hub, a protocol convertor, a proxy device, a firewall, a network address translator, a multiplexor, a modem, and a repeater. Defining location coordinates may include triangulating a plurality of unique signals to generate the location coordinates.

The plurality of unique signals may be received from a plurality of publically-accessible GPS satellites. The plurality of unique signals may be received from a plurality of proprietary signal transmitters. The location coordinates may include a longitudinal coordinate and a latitudinal coordinate. Defining a device identifier may include one or more of: defining an IP address as the device identifier; defining a MAC address as the device identifier; and defining a unique name as the device identifier. Processing the geospatial information to locate the data center device within the data center may include one or more of: rendering a graphical representation of the data center device within a graphical representation of the data center; rendering a text-based location for the data center device within the data center; and guiding a user to the data center device within the data center.

In another implementation, a computing system includes at least one processor and at least one memory architecture coupled with the at least one processor. A first software module is executed on the at least one processor and the at least one memory architecture. The first software module is configured to define a device identifier for a data center device within a data center. A second software module is executed on the at least one processor and the at least one memory architecture. The second software module is configured to define location coordinates for the data center device within the data center. A third software module is executed on the at least one processor and the at least one memory architecture. The third software module is configured to associate the device identifier with the location coordinates to define geospatial information for the data center device within the data center. A fourth software module is executed on the at least one processor and the at least one memory architecture. The fourth software module is configured to process the geospatial information to locate the data center device within the data center.

One or more of the following features may be included. The data center device may be chosen from the group consisting of: a rack, a server, a component of a storage array, a bridge, a router, a switch, a gateway, a hub, a protocol convertor, a proxy device, a firewall, a network address translator, a multiplexor, a modem, and a repeater. Defining location coordinates may include triangulating a plurality of unique signals to generate the location coordinates.

The plurality of unique signals may be received from a plurality of publically-accessible GPS satellites. The plurality of unique signals may be received from a plurality of proprietary signal transmitters. The location coordinates may include a longitudinal coordinate and a latitudinal coordinate. Defining a device identifier may include one or more of: defining an IP address as the device identifier; defining a MAC address as the device identifier; and defining a unique name as the device identifier. Processing the geospatial information to locate the data center device within the data center may include one or more of: rendering a graphical representation of the data center device within a graphical representation of the data center; rendering a text-based location for the data center device within the data center; and guiding a user to the data center device within the data center.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a diagrammatic view of a data center as rendered by the device location process of FIG. 1; and FIG. 4 is a diagrammatic view a personal digital assistant configured to work with the device location process of FIG. 1.

DETAILED DESCRIPTION OF THE PREFERRED EMBODIMENTS

System Overview

Figure 1:
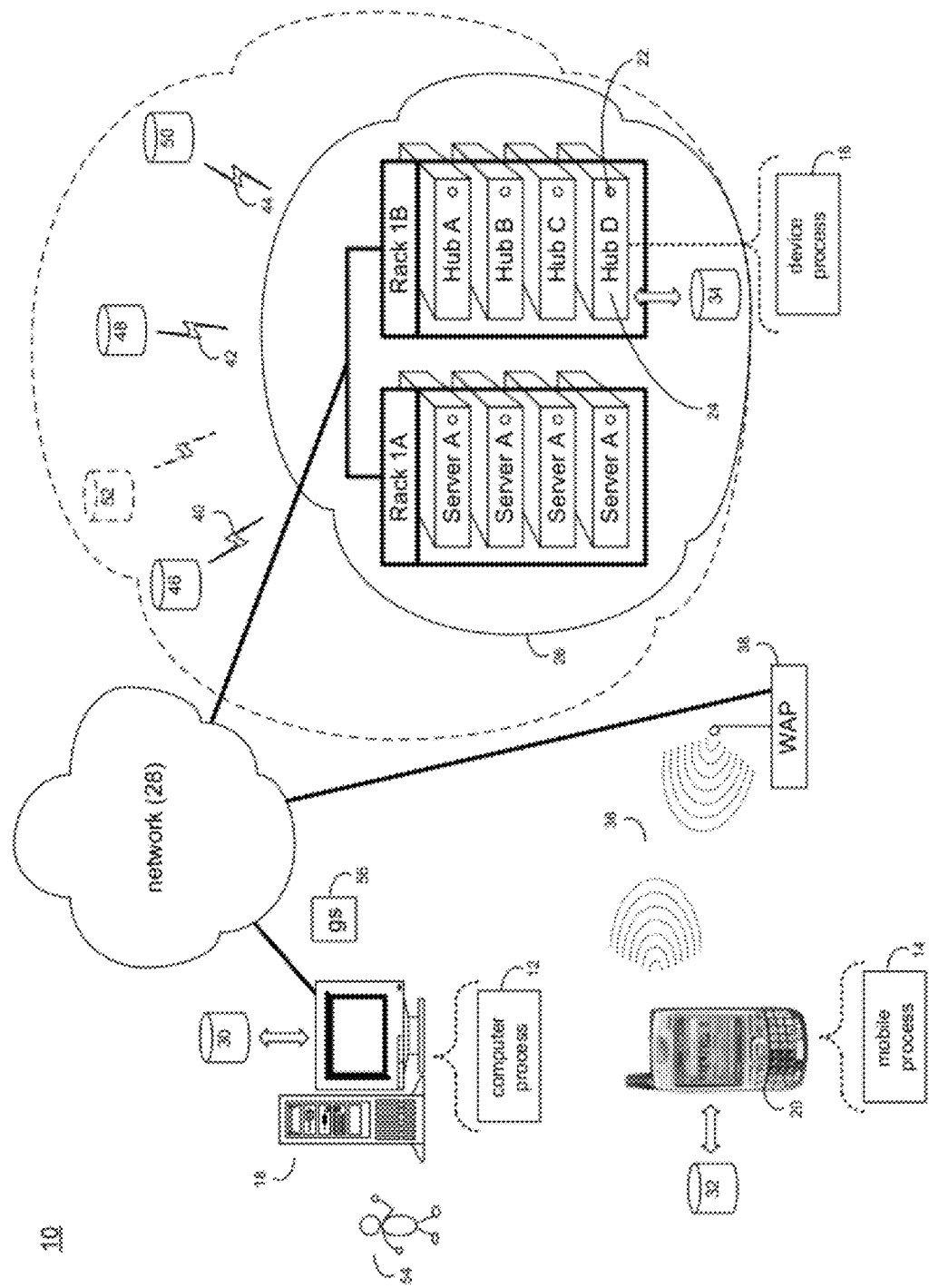
FIG. 1 is a diagrammatic view of a device location process executed in whole or in part by a computer coupled to a distributed computing network.
Figure 2:
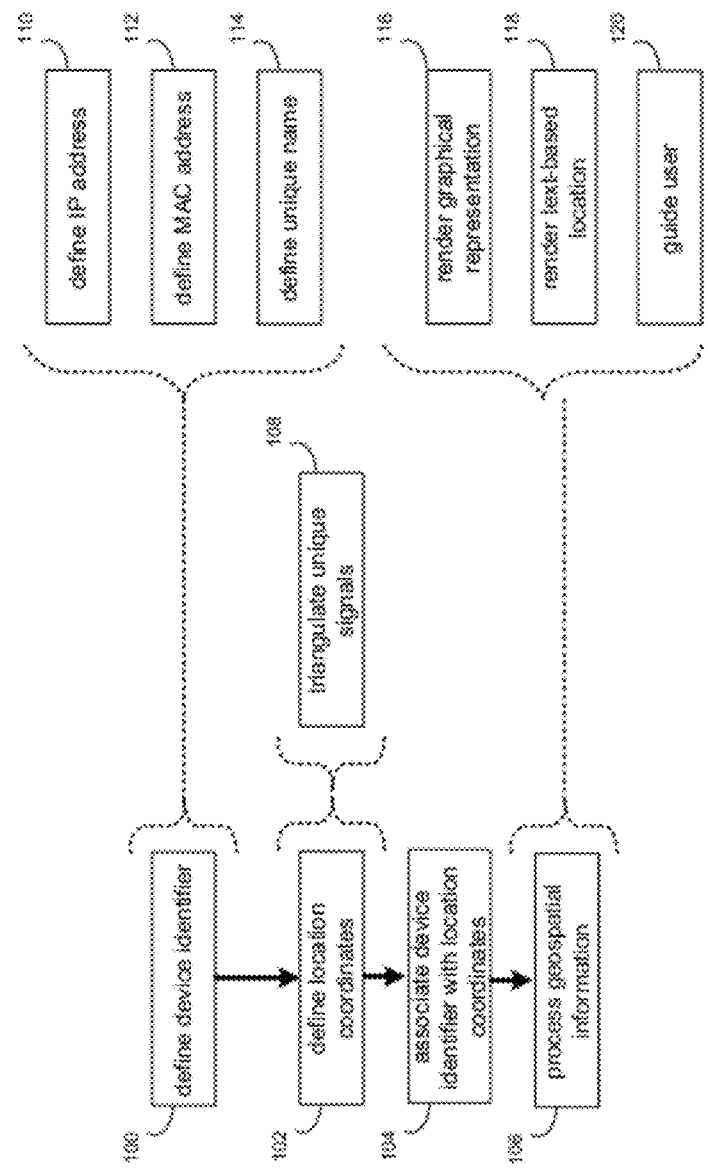
FIG. 2 is a flowchart of the device location process of FIG. 1.

Referring to FIGS. 1 & 2, there is shown device location process 10. Device location process 10 may include one or more of computer process 12, mobile process 14, and device process 16. Accordingly and for the following discussion, the device location process will be described generally as device location process 10, with the understanding that device location process 10 may include one or more of computer process 12, mobile process 14, and device process 16.

Desktop process 12 may be executed (in whole or in part) by computer 18 (e.g., a single server computer, a plurality of server computers, a general purpose computer, a laptop computer, or a notebook computer). Mobile process 14 may be executed (in whole or in part) by client electronic device 20 (e.g., a personal digital assistant, a data-enabled cellular telephone (not shown), a laptop computer (not shown), a notebook computer (not shown), or a dedicated client electronic device (not shown). Device process 16 may be executed (in whole or in part) by embedded device 22. Embedded device 22 may be incorporated into or coupled with data center device 24, examples of which may include but are not limited to a rack, a server, a component of a storage array, a bridge, a router, a switch, a gateway, a hub, a protocol convertor, a proxy device, a firewall, a network address translator, a multiplexor, a modem, and a repeater), which may be located within a data center (e.g., data center 26).

As will be discussed below in greater detail, device location process 10 may define 100 a device identifier (e.g., an IP address; a MAC address; or a unique name) for a data center device (e.g., data center device 24) within data center 26. Location coordinates (e.g., longitudinal coordinates, latitudinal coordinates, and/or altitudinal coordinates) may be defined 102 for the data center device (e.g., data center device 24) within data center 26. The device identifier (e.g., an IP address; a MAC address; or a unique name) may be associated 104 with the location coordinates (e.g., longitudinal coordinates, latitudinal coordinates, and/or altitudinal coordinates) to define geospatial information for the data center device (e.g., data center device 24) within the data center 26.

The geospatial information may be processed 106 to locate the data center device (e.g., data center device 24) within the data center 26.

Computer 18 may be coupled to network 28 (e.g., the Internet, an intranet, a local area network, a wide area network, and/or an extranet). Computer 18 may be e.g., a web server running a network operating system, examples of which may include but are not limited to Microsoft Windows Vista Server™, or Redhat Linux™. Computer 18 may also execute a web server application, examples of which may include but are not limited to Microsoft IIS™, or Apache Webserver™, that allows for remote access to computer 18 via network 28.

The instruction sets and subroutines of computer process 12, which may be stored on a storage device 30 coupled to computer 18, may be executed by one or more processors (not shown) and one or more memory architectures (not shown) incorporated into computer 18. Storage device 30 may include but is not limited to a hard disk drive, a tape drive, an optical drive, a RAID array, a random access memory (RAM), or a read-only memory (ROM).

The instruction sets and subroutines of mobile process 14, which may be stored on a storage device 32 coupled to client electronic device 20, may be executed by one or more processors (not shown) and one or more memory architectures (not shown) incorporated into client electronic device 20. Storage device 32 may include but is not limited to a hard disk drive, a random access memory (RAM), a read-only memory (ROM), or a flash memory device.

The instruction sets and subroutines of device process 16, which may be stored on storage device 34 coupled to the data center device (e.g., data center device 24), may be executed by one or more processors (not shown) and one or more memory architectures (not shown) incorporated into e data center device (e.g., data center device 24). Storage device 34 may include but is not limited to a hard disk drive, a tape drive, an optical drive, a RAID array, a random access memory (RAM), a read-only memory (ROM), or a flash memory device.

As discussed above, examples of client electronic device 20 may include but are not limited to a personal digital assistant, a data-enabled cellular telephone, a laptop computer, a notebook computer, or a dedicated client electronic device. Accordingly, client electronic device 20 may be wirelessly coupled to network 28 via e.g., wireless communication channel 36 established between client electronic device 20 and wireless access point (WAP) 38, which may be directly coupled to network 28.

While computer 18 is shown hardwired to network 28, this is for illustrative purposes only and is not intended to be a limitation of this disclosure, as other configurations are possible and are considered to be within the scope of this disclosure. For example, computer 18 may be wirelessly coupled to network 28 via e.g., a wireless communication channel established between computer 18 and wireless access point 38, which may be directly coupled to network 28.

While data center 26 (and, therefore, the data center devices (e.g., data center device 24) included within the data center 26) are shown hardwired to network 28, this is for illustrative purposes only and is not intended to be a limitation of this disclosure, as other configurations are possible and are considered to be within the scope of this disclosure. For example, data center 26 (and, therefore, the data center devices (e.g., data center device 24) included within the data center 26) may be wirelessly coupled to network 28 via e.g., a wireless communication channel established between data center 26 and wireless access point 38, which may be directly coupled to network 28.

The wireless access point 38 may be, for example, an IEEE 802.11a, 802.11b, 802.11g, Wi-Fi, and/or Bluetooth device that is capable of establishing a wireless communication channel between e.g., computer 18, client electronic device 20, and data center 26; and wireless access point 38.

As is known in the art, all of the IEEE 802.11x specifications use Ethernet protocols for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Device Location Process:

As discussed above, device location process 10 may define 100 a device identifier (e.g., an IP address; a MAC address; or a unique name) for a data center device (e.g., data center device 24) within data center 26. Location coordinates (e.g., longitudinal coordinates, latitudinal coordinates, and/or altitudinal coordinates) may be defined 102 for the data center device (e.g., data center device 24) within data center 26. The device identifier (e.g., an IP address; a MAC address; or a unique name) may be associated 104 with the location coordinates (e.g., longitudinal coordinates, latitudinal coordinates, and/or altitudinal coordinates) to define geospatial information for the data center device (e.g., data center device 24) within the data center 26. The geospatial information may be processed 106 to locate the data center device (e.g., data center device 24) within the data center 26.

Referring also to FIG. 3 and for illustrative purposes, assume that data center 26 includes a plurality of racks (in this example seventy-two), each of which may be populated with various devices, such as servers, a component of a storage array, bridges, routers, switches, gateways, hubs, protocol convertors, proxy devices, firewalls, network address translators, multiplexors, modems, and repeaters. Each of these devices may be interconnected (i.e., coupled) via network 28 or a subnetwork (not shown).

Some or all of the data center devices included within data center 26 (e.g., the racks, servers, a component of a storage array, bridges, routers, switches, gateways, hubs, protocol convertors, proxy devices, firewalls, network address translators, multiplexors, modems, and repeaters) may include embedded devices (e.g., embedded device 22) for locating the particular data center device within data center 26. Examples of embedded device 22 may include but are not limited to GPS devices that receive a plurality of unique signals (e.g., signals 40, 42, 44) from a plurality of publically-accessible GPS satellites or a plurality of proprietary signal transmitters (represented generically as signal devices 46, 48, 50). Examples of such proprietary signal transmitters (e.g., personal GPS transmitters, femtocells, and WiFi devices) may include but are not limited to proprietary signal transmitters located within/proximate data center 26. For certain applications (e.g., three-dimensional positioning applications), additional signal devices (e.g., signal device 50) may be required to generate additional unique signals.

The plurality of unique signals (e.g., signals 40, 42, 44) received by e.g., embedded device 22 may each uniquely e.g., identify the device transmitting the signal (e.g., signal devices 46, 48, 50 respectively) and the precise time that the signal was transmitted. The embedded device (e.g., embedded device 22) included within each data center device (e.g., data center device 24) may triangulate 108 e.g., signals 40, 42, 44 to define 102 the location coordinates concerning the data center device (e.g., data center device 24) associated with the embedded device (e.g., embedded device 22). Specifically, by precisely measuring the time-of-flight delay experienced by each of the plurality of unique signals, location coordinates of embedded device 22 (and therefore data center device 24) may be defined 102. As discussed above, the location coordinates defined 102 by device location process 10 may include longitudinal coordinates, latitudinal coordinates, and/or altitudinal coordinates (e.g., 53.12639 N, 61.51079W, 4 feet)

When defining 100 a device identifier for some or all of the data center devices included within data center 26, device location process 10 may allow an IP address to be defined 110 as the device identifier for data center device 24, a MAC address to be defined 112 as the device identifier for data center device 24, or a unique name to be defined 114 as the device identifier for data center device 24. This list is for illustrative purposes only, as other methodologies/nomenclatures may be utilized when defining 100 a device identifier.

When configuring data center 26, device location process 10 may allow user 54 to access embedded device 22 and define 100 a device identifier for e.g., data center device 24. For example, user 54 may define 114 the device identifier for data center device 24 as "Hub D" (i.e., a unique name), may define 110 the device identifier for data center device 24 as "192.168.1.1" (i.e., an IP address), and/or may define 112 the device identifier for data center device 24 as "1H.EF.A7.3B.4C.D1" (i.e., a MAC address).

As discussed above, the above-described device identifier (e.g., an IP address, a MAC address, and/or a unique name) may be associated 104 with the location coordinates (e.g., longitudinal coordinates, latitudinal coordinates, and/or altitudinal coordinates) to define geospatial (gs) information 56 for the data center device (e.g., data center device 24) within the data center 26. For example, geospatial information 56 for data center device 24 may include "Hub D" (i.e., a unique name), "192.168.1.1" (i.e., an IP address), "1H.EF.A7.3B.4C.D1" (i.e., a MAC address), and 53.12639 N, 61.51079W (i.e., longitudinal and latitudinal coordinates).

Additionally, environmental information may be added to geospatial information 56. For example, data center device 24 may include an internal temperature sensor (not shown). Accordingly, an internal temperature signal may be added to geospatial information 56. Other examples of such environmental information may include but are not limited to: external temperature information, power consumption information, failure notifications, and maintenance notifications.

Geospatial information 56 may be provided from e.g., embedded device 22 to computer process 12 via e.g., a wired communication medium (e.g., via network 28) or a wireless communication medium (e.g., via WAP 38). Once received by computer process 12, geospatial information 56 may be processed 106 to locate the data center device (e.g., data center device 24) within the data center 26.

The manner in which geospatial information 56 is processed 106 may vary depending on the manner in which device location process 10 is configured. For example, processing 106 geospatial information 56 may include rendering 116 a graphical representation 200 of data center device 24 within a graphical representation 202 of data center 26; rendering 118 text-based location information 204 for data center device 24 within data center 26; and/or guiding 120 a user (e.g., user 56) to data center device 24 within the data center 26.

Graphical representation 202 of data center 26 may be manually created (e.g., by user 56) and automatically populated/updated by device location process 10. For example, Aisle 1, Aisle 2, Aisle 3 and Aisle 4 may be permanent (or essentially permanent) within data center 26. Further, data center 26 (and the corresponding representations included within graphical representation 202) may be mapped in accordance with the location coordinates defined 102 by device location process 10 with respect to the embedded devices included within the various data center devices. Accordingly, when geospatial information 56 for data center device 24 (which includes "Hub D", "192.168.1.1", "1H.EF.A7.3B.4C.D1", and 53.12639 N, 61.51079W) is processed by device location process 10, the location within data center 26 defined by 53.12639 N, 61.51079W is known and locatable within graphical representation 202 of data center 26.

Assume for illustrative purposes that the only information displayed on graphical representation 202 is the location of the various racks (in this particular example, seventy-two racks) included within data center 26. Accordingly, as the geospatial information from each of these seventy-two racks is received and processed by device location process 10, graphical representation 202 of data center 26 may be rendered 116 with graphical presentations of each of the seventy-two racks.

As discussed above, environmental information may be added to the geospatial information (e.g., geospatial information 56) associated with a data center device (e.g., data center device 24). Assume that the environmental information includes an indicator of a failure condition (e.g., a general failure of Hub D). Accordingly, user 54 may need to replace/repair Hub D (i.e., data center device 24). Assuming that user 54 is not familiar with data center 26, user 54 may query device location process 10 to identify the location of data center device 24 (i.e., the "failed" Hub D). Therefore, user 54 may define the device to be located within query field 206 and execute the query. Device location process 10 may process 106 the geospatial information associated with data center device 24 (i.e., the "failed" Hub D) to locate data center device 24 within data center 26. In this particular example, as data center device 24 is a located within Rack 1B, the location coordinates of data center device 24 may be the same as the location coordinates of Rack 1B (assuming the use of two-dimensional coordinates). Accordingly, device location process 10 may render 116 graphical representation 200 (e.g., an asterisk) of data center device 24 (i.e., the "failed" Hub D) positioned proximate a graphical representation 208 of Rack 1B.

When rendering 118 text-based location information 204 for data center device 24 within data center 26, device location process 10 may textually define the location of the device being sought (e.g., data center device 24) within data center 26. For example, device location process 10 may render 118 text-based location information 204 stating that "Hub D is located in Rack 1B on the left hand side of Aisle 1".

Concerning the environmental information added to the geospatial information (e.g., geospatial information 56) associated with a data center device (e.g., data center device 24), some or all of this environmental information may be graphically represented within graphical representation 202 of data center 26. For example, graphical representation 202 of data center 26 may define one or more geographic areas that are above a certain temperature threshold or power consumption threshold (e.g., as generically represented by geographic area 210).

Referring also to FIG. 4 and as discussed above, device location process 10 may guide 120 user 54 to data center device 24 within data center 26. Specifically, mobile process 14 may be configured to include some, most or all of the functionality of computer process 12. Accordingly, user 54 may be able to utilize mobile process 14 to visually and textually locate devices within data center 26 (as described above with respect to computer process 12). Further, mobile process 14 may be configured to guide 120 user 54 to data center device 24 within the data center 26. Specifically, client electronic device 20 may include an embedded device (not shown) that allows the location of client electronic device 20 to be defined (in a fashion similar to that of the various data center devices included within data center 26). Accordingly, in a fashion similar to the manner in which a handheld GPS devices guides a user to a waypoint, client electronic device 20 may be configured to guide 120 user 54 to the device to be located (e.g., data center device 24). Depending on the manner in which mobile process 14 is configured, onscreen prompts 160 may be rendered on the display screen of client electronic device 20 that e.g., show graphical representations of data center 26, provide distances until an action (e.g., a turn) is required, and/or provide as the-crow-flies distances to the device to be located (e.g., data center device 24). Additionally/alternatively, audible prompts may be provided to user 54 by client electronic device 20.

A number of implementations have been described. Nevertheless, it will be understood that various modifications may be made. Accordingly, other implementations are within the scope of the following claims.

What is claimed is:

1. A computer-implemented method comprising:
defining, via one or more computing devices, a device identifier for a data center device within a data center that includes a plurality of data center devices, the data center device being one of the plurality of data center devices;
defining, via the one or more computing devices, location coordinates for the data center device within the data center that includes the plurality of data center devices;
associating, via the one or more computing devices, the device identifier with the location coordinates to define geospatial information for the data center device within the data center that includes the plurality of data center devices; and
processing, via the one or more computing devices, the geospatial information to locate the data center device within the data center that includes the plurality of data center devices.

2. The computer-implemented method of claim 1 wherein the data center device is chosen from the group consisting of:
a rack, a server, a component of a storage array, a bridge, a router, a switch, a gateway, a hub, a protocol convertor, a proxy device, a firewall, a network address translator, a multiplexor, a modem, and a repeater.

3. The computer-implemented method of claim 1 wherein the location coordinates include a longitudinal coordinate and a latitudinal coordinate.

4. The computer-implemented method of claim 1 wherein defining a device identifier includes one or more of:
defining an IP address as the device identifier;
defining a MAC address as the device identifier; and
defining a unique name as the device identifier.

5. The computer-implemented method of claim 1 wherein processing the geospatial information to locate the data center device within the data center includes one or more of:
rendering a text-based location for the data center device within the data center; and
guiding a user to the data center device within the data center.

6. The computer-implemented method of claim 1, further comprising:
receiving the geospatial information for the data center device from an embedded device included within the data center device.

7. The computer-implemented method of claim 1, further comprising:
   rendering a graphical representation of the data center device within a graphical representation of the data center.

8. The computer-implemented method of claim 1 wherein defining location coordinates includes:
   triangulating a plurality of unique signals to generate the location coordinates.

9. The computer-implemented method of claim 8 wherein the plurality of unique signals are received from at least one of:
   a plurality of publically-accessible GPS satellites; and
   a plurality of proprietary signal transmitters.

10. The computer-implemented method of claim 9, wherein one or more of the plurality of proprietary signal transmitters is located within the data center that includes a plurality of data center devices.

11. A non-transitory computer program product residing on a non-transitory computer readable medium having a plurality of instructions stored thereon that, when executed by a processor, cause the processor to perform operations comprising:
   defining a device identifier for a data center device within a data center that includes a plurality of data center devices, the data center device being one of the plurality of data center devices;
   defining location coordinates for the data center device within the data center that includes the plurality of data center devices;
   associating the device identifier with the location coordinates to define geospatial information for the data center device within the data center that includes the plurality of data center devices; and
   processing the geospatial information to locate the data center device within the data center that includes the plurality of data center devices.

12. The computer program product of claim 11 wherein the data center device is chosen from the group consisting of:
   a rack, a server, a component of a storage array, a bridge, a router, a switch, a gateway, a hub, a protocol convertor, a proxy device, a firewall, a network address translator, a multiplexor, a modem, and a repeater.

13. The computer program product of claim 11 wherein the location coordinates include a longitudinal coordinate and a latitudinal coordinate.

14. The computer program product of claim 11 wherein the instructions for defining a device identifier include instructions for one or more of:
   defining an IP address as the device identifier;
   defining a MAC address as the device identifier; and
   defining a unique name as the device identifier.

15. The computer program product of claim 11 wherein the instructions for processing the geospatial information to locate the data center device within the data center include instructions for one or more of:
   rendering a graphical representation of the data center device within a graphical representation of the data center;
   rendering a text-based location for the data center device within the data center; and
   guiding a user to the data center device within the data center.

16. The computer program product of claim 11 wherein the instructions for defining location coordinates include instructions for:
   triangulating a plurality of unique signals to generate the location coordinates.

17. The computer program product of claim 16 wherein the plurality of unique signals are received from at least one of:
   a plurality of publically-accessible GPS satellites; and
   a plurality of proprietary signal transmitters.

18. A computing system comprising:
   at least one processor;
   at least one memory architecture coupled with the at least one processor;
   a first software module executed on the at least one processor and the at least one memory architecture, wherein the first software module is configured to define a device identifier for a data center device within a data center that includes a plurality of data center devices, the data center device being one of the plurality of data center devices;
   a second software module executed on the at least one processor and the at least one memory architecture, wherein the second software module is configured to define location coordinates for the data center device within the data center that includes the plurality of data center devices; and
   a third software module executed on the at least one processor and the at least one memory architecture, wherein the third software module is configured to associate the device identifier with the location coordinates to define geospatial information for the data center device within the data center that includes the plurality of data center devices; and
   a fourth software module executed on the at least one processor and the at least one memory architecture, wherein the fourth software module is configured to process the geospatial information to locate the data center device within the data center that includes the plurality of data center devices.

19. The computing system of claim 18 wherein the data center device is chosen from the group consisting of:
   a rack, a server, a component of a storage array, a bridge, a router, a switch, a gateway, a hub, a protocol convertor, a proxy device, a firewall, a network address translator, a multiplexor, a modem, and a repeater.

20. The computing system of claim 18 wherein the location coordinates include a longitudinal coordinate and a latitudinal coordinate.

21. The computing system of claim 18 wherein the first software module is further configured to:
   define an IP address as the device identifier;
   define a MAC address as the device identifier; and
   define a unique name as the device identifier.

22. The computing system of claim 18 wherein the fourth software module is further configured to:
   render a graphical representation of the data center device within a graphical representation of the data center;
   render a text-based location for the data center device within the data center; and
   guide a user to the data center device within the data center.

23. The computing system of claim 18 wherein the second software module is further configured to:
   triangulate a plurality of unique signals to generate the location coordinates.

24. The computing system of claim 23 wherein the plurality of unique signals are received from at least one of:
   a plurality of publically-accessible GPS satellites; and
   a plurality of proprietary signal transmitters.

* * * * *